United States Patent

Abeck et al.

[15] 3,652,334

[45] Mar. 28, 1972

[54] MAGNETIC MATERIAL AND METHOD OF MAKING THE SAME

[72] Inventors: Wilhelm Abeck, Leverkusen-Steinbuechel; Heinrich Kober, Munich; Bernhard Seidel, Gruenwald, all of Germany

[73] Assignee: Agfa-Gevaert Aktiengesellschaft, Leverkusen, Germany

[22] Filed: Nov. 7, 1968

[21] Appl. No.: 774,209

[30] Foreign Application Priority Data

Nov. 25, 1967 Germany ......................P 15 92 214.2

[52] U.S. Cl. ............................117/236, 117/100 I, 117/235, 252/62.54, 252/62.55, 148/122, 148/31.5

[51] Int. Cl. ..........................................................H01f 10/00

[58] Field of Search .......................117/234, 236, 235, 100 I; 252/62.54, 62.55; 148/122, 31.5

[56] References Cited

UNITED STATES PATENTS

| | | | |
|---|---|---|---|
| 3,042,543 | 7/1962 | Schuele | 117/235 X |
| 3,206,338 | 9/1965 | Miller et al | 148/31.55 X |
| 3,288,563 | 11/1966 | Klomp et al | 252/62.56 X |
| 3,382,174 | 5/1968 | Hund | 252/62.56 X |
| 3,498,748 | 3/1970 | Greiner | 252/62.56 X |

*Primary Examiner*—William D. Martin
*Assistant Examiner*—Bernard D. Pianalto
*Attorney*—Michael S. Striker

[57] ABSTRACT

Magnetic gamma-$Fe_2O_3$ particles particularly useful as magnetizable material for magnetic recording media, area produced by treating alpha-FeOOH particles with a solution of a hydrolysis-resistant, inorganic substance capable of forming on the alpha-FeOOH particles a firmly adhering covering, so that the individual alpha-FeOOH particles will be substantially covered by such substance, and by converting the thus pretreated alpha-FeOOH particles into gamma-$Fe_2O_3$.

10 Claims, No Drawings

MAGNETIC MATERIAL AND METHOD OF MAKING THE SAME

BACKGROUND OF THE INVENTION

The invention is concerned with a method of producing gamma-$Fe_2O_3$ particles which are suitable for use as the magnetic material of magnetic recording media, to the thus obtained product and to magnetic recording media incorporating such product.

Conventionally, the magnetizable material of magnetic recording media such as recording tapes and the like consists of brown gamma-$Fe_2O_3$. This material is generally produced by precipitating $Fe(OH)_2$ by means of a base, for instance an alkali metal hydroxide, from $FeSO_4$ solutions and oxidizing the $Fe(OH)_2$ with air at temperatures of up to 65° C. from the aqueous phase so as to obtain as an intermediate product alpha-FeOOH.

The thus-obtained needle-shaped alpha-FeOOH is generally allowed to grow by precipitating on the needle nuclei further oxide-hydrate in the presence of $FeSO_4$ solution, metallic iron and the oxygen of the air.

The thus-obtained particles of alpha-FeOOH are then washed in order to be freed of soluble constituents of the aqueous phase, dried, ground and dewatered at temperatures of between 250° and 300° C. to form alpha-$Fe_2O_3$. The thus-obtained material is then reduced with hydrogen at temperatures between 300° and 500° C. to form $Fe_3O_4$ and then re-oxidized at between 200° and 350° C. by means of oxygen of the air to form the gamma phase of $Fe_2O_3$.

It is well known that by increasing the temperature at which the above-described reduction is carried out, better formed and more faultless crystal structures of the magnetizable gamma-$Fe_2O_3$ are obtained and that thereby the coercive force and the print-through ratio of the magnetic layers formed thereof will be improved.

However, when carrying out the reduction at temperatures of about 400° C. or higher temperatures, reduction is accompanied by a baking together or adhering of the needle-shaped particles to each other in a more or less sinter-like manner.

The result of this adherence of the needles to each other is a worsening of the magnetic and electroacoustic properties of the recording media produced with such materials, and an adverse effect on the magnetic orientation and the signal to noise ratio. Furthermore, particularly in the case of finely subdivided pigments, the dispersibility and the grinding of the pigments in a binder-solvent mixture are unfavorably affected.

For these reasons, it was extremely difficult up to now to produce finely subdivided alpha-FeOOH at the, per se desirable, reduction temperatures of about 400° C. or above.

More recently, it has been proposed to treat the needle-shaped alpha-FeOOH with solutions of aluminum, titanium or zirconium salts or of alkali metal silicates, in order to obtain an improved stabilization. Thereby, the pH value of the solutions is to be adjusted within the range of incipient hydrolysis of these salts. It is possible thereby to reduce the technical and thus also financial requirements for maintaining a constant relatively low temperature during the reduction process, but in order to achieve the desired stabilizing effect, it is necessary to closely watch exact maintenance of the desired pH value after addition of the soluble salts.

It is an object of the present invention to provide an improved method for producing gamma-$Fe_2O_3$ in a simple and economical manner, and the present invention also encompasses the thus-obtained product as well as magnetic recording media incorporating this product.

SUMMARY OF THE INVENTION

The present invention contemplates a method of producing magnetic gamma-$Fe_2O_3$ which comprises the steps of treating alpha-FeOOH particles with at least one hydrolysis-resistant inorganic substance which is capable of forming a pigment-covering on the alpha-FeOOH particles so that these particles will be substantially covered with the substance, followed by converting the thus-pretreated alpha-FeOOH particles into gamma $Fe_2O_3$.

Generally, the converting is carried out by reducing the FeOOH to $Fe_3O_4$ and oxidizing of the last-obtained product to gamma-$Fe_2O_3$.

The treatment preferably is carried out by forming an aqueous dispersion of the alpha-FeOOH particles and introducing into the dispersion under vigorous stirring a relatively concentrated aqueous solution of the substance which is supposed to form the covering of the alpha-FeOOH particles, followed by separating of the thus-treated moist particles from the residual liquid and drying of the moist particles.

Preferably, a covering will be produced on the alpha-FeOOH particles which has a weight equal to about 0.1 and 6 percent of the dry weight of the particles and most preferably the weight of the covering will be between about 0.5 and 3 percent of the dry weight of the alpha-FeOOH particles.

The inorganic substance which is applied in aqueous solution and of which the covering is to be formed, generally will be an oxyacid of phosphorus or boron and/or a water-soluble salt thereof.

Thus, phosphoric acid, water-soluble mono-, di- and triphosphates and metaphosphates as well as water-soluble borates may be advantageously used and specific compounds falling within this scope and with which excellent results are obtained include potassium and ammonium dihydrogen-phosphate, disodium and dilithium orthophosphate, trisodium phosphate, sodium pyrophosphate, sodium metaphosphate, sodium and potassium tetraborate and sodium metaborate.

Excellent results are also obtained with mono-, di- and tri-alkali metal phosphates, alkali metal pyrophosphates, alkali metal metaphosphates and alkali metal borates.

The present invention contemplates also the thus-obtained gamma-$Fe_2O_3$, as well as a ferromagnetic recording medium which comprises a support and a magnetizable layer adhering to the support, whereby the layer consists essentially of a binder having magnetic gamma-$Fe_2O_3$ obtained by the above-described method distributed therethrough.

DESCRIPTION OF THE PREFERRED EMBODIMENTS

Surprisingly it has been found that a surface pigment covering of the alpha-FeOOH particles as briefly described above will not only improve the magnetic properties of the gamma-$Fe_2O_3$ produced therefrom and the electroacoustic properties of the magnetic layers but will also permit carrying out of the above-described reduction at the desirable higher temperatures, and all of the foregoing can be accomplished in a very simple and economic manner by forming an aqueous dispersion of FeOOH particles produced in conventional manner, for instance as described above, and washed so as to be free of soluble impurities, and introducing into the thus-formed dispersion, preferably under vigorous agitation, an hydrolysis-resistant inorganic substance such as an oxyacid of phosphorus or boron or salts of such acids. The inorganic substance is preferably introduced in the form of a solution, preferably a concentrated aqueous solution thereof.

By adsorption of the inorganic substance or substances at the surface of the alpha-FeOOH particles, it is possible to fully realize during the further processing to gamma-$Fe_2O_3$ the advantages of increased reduction temperatures.

Inorganic, water-soluble, hydrolysis-resistant substances which are excellently suitable for the above-mentioned purpose include phosphoric acid, soluble mono-, di- and triphosphates, such as potassium or ammonium dihydrogen phosphate, disodium- or dilithium orthophosphate, trisodium phosphate, diphosphates, particularly sodium pyrophosphate, metaphosphates, for instance sodium metaphosphate, as well as soluble borates such as alkali metal borates, sodium tetraborate, potassium tetraborate and sodium metaborate. Each of these and similar compounds may be used singly, or mixtures and combinations thereof may be used, whereby the pyrophosphates are the preferred phosphate compounds for the above-mentioned purpose.

The concentration of the pigment covering-forming substances may vary within wide ranges and generally will be such that a covering having a weight between 0.1 and 6 percent of the weight of the water-free alpha-FeOOH will be formed and preferably the covering will have a weight of between 0.5 and 3 percent of the weight of the water-free alpha-FeOOH.

The optimum concentration with respect to each of the compounds or substances used for forming the pigment covering can be easily determined in each given case by simple experimentation.

The pigment covering-forming substances may be admixed to the alpha-FeOOH at various stages of the processing thereof. However, since it is not desirable to incorporate the substances in the interior of the crystallites, it is important that these substances must not be present during the precipitation and growing of the alpha-FeOOH particles or crystallites. Furthermore, the effectiveness is reduced if the pigment covering is formed at the stage of the dewatered alpha-FeOOH, i.e., at the stage of the red alpha-$Fe_2O_3$.

The method of the present invention is not limited to forming pigment coverings on needle-shaped alpha-FeOOH but is equally applicable for producing cubic particles, either in pure form or doped with other elements, for instance cobalt.

For producing the pigment covering, the alpha-FeOOH particles are dispersed in water and the desired amount of the covering-forming substance, dissolved in a small amount of water is slowly introduced into the dispersion under vigorous agitation or stirring. In order to achieve uniform distribution, agitation or stirring is continued for several minutes after all of the aqueous solution of the covering substance has been introduced. Thereafter, the suspension is filtered, the wet particles which are thus separated are dried and then ground. The thus-treated material is then further converted into gamma-$Fe_2O_3$ in conventional manner, but the reduction may be carried out at higher temperatures and it has been found that at least up to a temperature of 470° C., the reduction will achieve an increase in the coercive force without any baking together of the material such as would be the case if alpha-FeOOH particles which were not treated as described above were subjected, after conversion into alpha-$Fe_2O_3$, to reduction at such high temperatures.

Furthermore, it has been found that the product obtained according to the present invention can be more easily ground in a binder solvent mixture and that a lesser reduction in coercive force is experienced during the grinding process together with an improved magnetic orientation of the pigment suspension, particularly in the case of very finely subdivided pigments, as well as an improved signal to noise ratio of the magnetizable layers formed therewith.

Magnetizable layers such as are used for instance in magnetic recording media, recording tapes and the like, are then produced in conventional manner by dispersing the gamma-$Fe_2O_3$ particles obtained as described above in a polymer binder. Conventionally, suitable binding agents for this purpose are found to be homo-polmerizates and co polymerizates of polyvinyl derivatives, polyurethanes, polyesters and the like, as well known to those skilled in the art. The binding agents are utilized as solutions thereof in suitable organic solvents which may include further additions, for instance for the purpose of improving the dispersibility of the particles, the conductivity and the operational resistance of the magnetizable or magnetic layers. The magnetic layers may be applied to any desired support which may be rigid or flexible, such as plates, foils, sheets and the like, again as well known to those skilled in the art.

The following examples are given as illustrative only without, however, limiting the invention to the specific details of the examples.

EXAMPLE 1

The filter cake of needle-shaped alpha-FeOOH crystal nuclei of an average particle size of 0.25 microns, produced by oxidation in air of $Fe(OH)_2$ which has been precipitated by means of alkali from a $FeSO_4$ solution, which filter cake has a dry substance content of 300 grams, is dispersed in 9 liters water. While stirring intensively, 5 grams $Na_4P_2O_7 \cdot 10H_2O$, dissolved in 50 ml. water are added. Stirring is continued for 10 minutes and thereafter the dispersion is filtered, the residue dried at 120° C., ground and dehydrated. The subsequent reduction is carried out in a hydrogen gas atmosphere at a temperature of between 440° and 450° C. and the reduced product is then re-oxidized in conventional manner.

The thus-obtained gamma-$Fe_2O_3$ is dispersed in a binder consisting of a partially hydrolized co-polymerizate of vinyl chloride and vinyl acetate in accordance with Example 1 of British Pat. No. 1,080,614, ground, dispersed and poured onto a support consisting of a polyester foil having a thickness of 15 microns. The thus-obtained magnetic or magnetizable layer has a thickness of 8.0 microns and will contain 13.5 grams of gamma-$Fe_2O_3$ per square meter. For comparison purposes, a magnetic tape is prepared in a similar manner but utilizing gamma-$Fe_2O_3$ which had not been pre-treated as described above.

The results obtained in these two cases are summarized in Table I.

TABLE I

| | gamma-$Fe_2O_3$ with pretreatment | gamma-$Fe_2O_3$ without pretreatment |
|---|---|---|
| Coercive force (gamma-$Fe_2O_3$) | 370 Oe | 312 Oe |
| Magnetic orientation ($B_R/B_S$ determined on tape) | 0.81 | 0.72 |
| Relative signal to noise ratio | +3 db. | 0 (comparison standard) |

EXAMPLE 2

1.5 g. sodium metaphosphate, dissolved in 50 ml. water, are introduced into a FeOOH suspension in the manner described in Example 1. Further working up is carried out at a reduction temperature of between 380° and 390° C.

The iron oxide suspension is ground and dispersed in a binder mixture formed of a co-polymerizate of polyvinyl chloride and polyvinyl acetate and a polyester which is reacted with isocyanate according to Example 1 of German published application Pat. No. 1,250,804. After applying the thus-produced dispersion to a polyester foil having a thickness of 30 microns, and subsequent drying, a magnetizable layer having a thickness of 12 microns and a gamma-$Fe_2O_3$ content of 20 grams per square meter is formed.

Table II compares the characteristics of the thus-obtained recording tape with that of a similarly produced tape in which, however, the $Fe_2O_3$ had not been produced with the pretreatment according to the present invention.

TABLE II

| | Gamma-$Fe_2O_3$ with pretreatment | Gamma-$Fe_2O_3$ without pretreatment |
|---|---|---|
| Coercive force (gamma-$Fe_2O_3$) | 354 Oe | 293 Oe |
| Magnetic orientation (determined in dispersion) | 0.84 | 0.81 |
| Relative signal to noise ratio | +2 db. | 0 (comparison standard) |

Due to the pigment covering obtained in the inventive pretreatment, the grinding of the gamma-$Fe_2O_3$ suspension in the binder solution could be reduced by 25 percent, namely from 28 to 21 hours.

EXAMPLE 3

The tests were carried out as described in Example 2 with the only difference that 1.5 g $NaPO_3$ were replaced with 3.4 g. $NaBO_2 \cdot 4H_2O$. The thus-obtained results are summarized in Table III.

TABLE III

| | gamma-$Fe_2O_3$ with pretreatment | gamma-$Fe_2O_3$ without pretreatment |
|---|---|---|
| Coercive force (gamma-$Fe_2O_3$) | 358 Oe | 313 Oe |
| Magnetic orientation ($B_R/B_S$ determined in dispersion) | 0.88 | 0.84 |
| Relative signal to noise ratio | +2 db. | 0 (comparison standard) |

Without further analysis, the foregoing will so fully reveal the gist of the present invention that others can by applying current knowledge readily adapt it for various applications without omitting features that, from the standpoint of prior art, fairly constitute essential characteristics of the generic or specific apsects of this invention.

What is claimed as new and desired to be protected by Letters Patent is set forth in the appended

1. A method of producing magnetic gamma-$Fe_2O_3$ comprising the steps of forming an aqueous dispersion of alpha-FeOOH particles, introducing into said dispersion at least one hydrolysis resistant water-soluble inorganic substance selected from the group consisting of oxyacids of phosphorus and boron and salts thereof capable of forming a pigment covering on said alpha-FeOOH particles, so as to substantially cover said alpha-FeOOH particles with said substance, separating the covered alpha-FeOOH particles from the residual liquid and converting the thusly pretreated alpha-FeOOH particles into gamma-$Fe_2O_3$.

2. A method as defined in claim 1, wherein said treating is carried out so as to obtain on said alpha-FeOOH particles a pigment covering having a weight equal to between about 0.1 and 6 percent of the dry weight of said particles.

3. A method as defined in claim 2, wherein the weight of said pigment covering equals between about 0.5 and 3 percent of the dry weight of said particles.

4. A method as defined in claim 1, wherein said substance is selected from the group consisting of phosphoric acid, water soluble mono-, di- and triphosphates and meta-phosphates, and water soluble borates.

5. A method as defined in claim 1, wherein said substance is selected from the group consisting of potassium and ammonium dihydrogen phosphate, disodium and dilithium orthophosphate, trisodium phosphate, sodium pyrophosphate, sodium metaphosphate, sodium and potassium tetraborate and sodium metaborate.

6. A method as defined in claim 1, wherein said substance is selected from the group consisting of phosphoric acid and mono-, di- and tri-alkali metal phosphates.

7. A method as defined in claim 1, wherein said substance is at least one alkali metal pyrophosphate.

8. A method as defined in claim 1, wherein said substance is at least one alkali metal metaphosphate.

9. A method as defined in claim 1, wherein said substance is at least one alkali metal borate.

10. The product obtained by the process of claim 1.

* * * * *